United States Patent [19]

Holleran

[11] Patent Number: 5,474,607
[45] Date of Patent: Dec. 12, 1995

[54] BITUMEN EMULSIONS

[75] Inventor: Glynn Holleran, Yarraville, Australia

[73] Assignee: Emoleum (Australia) Limited, Melbourne, Australia

[21] Appl. No.: 937,863

[22] PCT Filed: May 6, 1991

[86] PCT No.: PCT/AU91/00186

§ 371 Date: Oct. 19, 1992

§ 102(e) Date: Oct. 19, 1992

[87] PCT Pub. No.: WO91/17228

PCT Pub. Date: Nov. 14, 1991

[30]   Foreign Application Priority Data

May 7, 1990 [AU] Australia ................................. PJ9991

[51] Int. Cl.$^6$ ............................ C08L 95/00; B01J 13/00; B01D 17/04
[52] U.S. Cl. ........................ 106/277; 252/311.5; 252/319; 252/328; 252/332; 252/341
[58] Field of Search ......................... 106/277; 252/311.5, 252/319, 328, 332, 341

[56]               References Cited

U.S. PATENT DOCUMENTS

| 3,689,297 | 9/1972 | Dybalski et al. | 106/297 |
| 3,689,298 | 9/1972 | Dybalski et al. | 106/280 |
| 3,928,061 | 12/1975 | Hellsten et al. | 106/277 |
| 4,007,127 | 2/1977 | Smadja et al. | 106/277 |
| 4,008,096 | 2/1977 | Knapp | 106/277 |
| 4,172,821 | 10/1979 | Bloombaum et al. | 106/277 |
| 4,338,136 | 7/1982 | Goullet et al. | 106/277 |
| 4,351,750 | 9/1982 | Ferm et al. | 252/311.5 |
| 4,462,840 | 7/1984 | Schilling et al. | 106/277 |
| 4,576,648 | 3/1986 | Demangeon et al. | 106/269 |
| 4,997,868 | 3/1991 | Blanpain et al. | 524/59 |
| 5,085,704 | 2/1992 | Schilling et al. | 106/277 |

FOREIGN PATENT DOCUMENTS

| 514897 | 8/1977 | Australia . | |
| 66626/86 | 6/1987 | Australia | B27K 3/34 |
| 13140/88 | 9/1988 | Australia | C08L 95/00 |
| 50265/85 | 1/1989 | Australia | E01C 7/35 |
| 9991 | 5/1990 | Australia | C01C 3/14 |
| 610138 | 5/1991 | Australia | C08L 95/00 |
| 637491 | 7/1992 | Australia | C10C 3/14 |
| 0162591 | 11/1985 | European Pat. Off. | C08J 3/00 |
| 0246063 | 11/1987 | European Pat. Off. | C10C 3/00 |
| 02460634 | 11/1987 | European Pat. Off. | C10C 3/00 |
| 1929302 | 12/1970 | Germany | C08L 95/00 |
| 3313971 | 10/1983 | Germany | B01F 17/22 |
| 234873 | 4/1986 | Germany | C08L 95/00 |
| 3605136 | 10/1986 | Germany | B01J 13/00 |
| 8400757-A | 8/1985 | Sweden . | |
| 453760 | 2/1988 | Sweden | C01L 95/00 |
| 2208270 | 3/1989 | United Kingdom | C09L 95/00 |
| WO85/00040 | 1/1985 | WIPO | C09D 15/00 |

OTHER PUBLICATIONS

Pierrefitte–Auby, "Cationics for Roads," pp. 3–58. Month not available.
Akzo Chemie Nederland B.V. brochure, Cationics in Roads month not available.
Colas S. A., brochure "Emulcol" Jun. 1985.
Shaw, D. J., "Introduction to Colloid and Surface Chemistry," Chapter 10, Butterworth's 3rd Ed., 1980, pp. 233–245. month not available.
Holleran, G., et al., "Pavement Performance & Materials," *16th Conf. Proc.—Part 2 Australian Road Research Board Limited*, Nov. 9–12, 1992, pp. 237–255.
Lane, A. R., et al., "The Preparation and Properties of Bitumen Emulsion Stabilized by Cationic Surface–Active Agents," pp. 157–175 month not available.
Becher, P., *Emulsions: Theory and Practice*, "Physical Properties of Emulsions," pp. 49–94 month no available.
Undated Letter to Mr. Wally Holtrop of Vic Roads from Dr. John B. Watkins, inventor and author of pertinent disclosure documents.
ASTM D244 Manual, pp. 116 and 117 month not available.
Taylor, Spencer E., "Resolving Crude Oil Emulsions," *Chemistry & Industry*, No. 20, Oct. 19, 1992, pp. 770–773.
G. D. Hobson, *Modern Petroleum Technology*, 5th Ed., Part II, pp. 1064–1065, Sep. 1989.
"Emulsions and Emulsion Technology," edited by Kenneth J. Lissant, Marcel Dekker, Inc. 1974, Chapter 2, pp. 72–124, Chapter 8, pp. 387–440. month not available.
J. Lysenko, Bitumen Emulsion Workshops, Program and Papers, Australian Road Research Board, Oct. 10–16, 1985, pp. 1–168.
ScanRoad Technical Bulletin 2, "Bitumen Emulsions," May 1983, pp. 1–15.
Asphalt Emulsion Manufacturers Association, "A Basic Asphalt Emulsion Manual," Second Edition, pp. 1–16, (1979). month not available.
Akzo Chemie America, Bulletin 84 21, "Redicote Emulsifiers for Asphalt Emulsions," 1984, pp. 1–18. month not available.
Colas Roads Division brochure, "Surfix 80 Road Surface, Dressing Binder," two pages (Oct. 1983).
Kumagai Gumi Co., Ltd. brochure, "Texsol Green Method, Artificial Bed Consisting of Soil Globules and Fibers," Japan, 1989. month not available.
Langumier, G., "Emulcol First of a New Line of Surface Dressing Concepts," Document No. 4, Jun. 1985, Colas, pp. 1–21.
Emulsion Science, Sherman, P. Ed., Academic Press, 1968, pp. 66–69. month not available.

(List continued on next page.)

*Primary Examiner*—Paul Lieberman
*Assistant Examiner*—Patricia L. Hailey
*Attorney, Agent, or Firm*—Oliff & Berridge

[57]               ABSTRACT

A method of modifying a cationic bitumen emulsion by initiating coalescence by either (i) adding a specific chemical agent or (ii) physical reaction. The method includes modifying the bitumen emulsion by combining a second emulsion with a primary emulsion having an aqueous phase to create a bimodal distribution.

9 Claims, No Drawings

OTHER PUBLICATIONS

Shaw, D. J., "Introduction to Colloid and Surface Chemistry," 3rd Ed., 1966, pp. 127–147. month not available.

Macro– and Microemulsions, Theory and Applications, Shah, D. O., Ed., ACS Symposium Series 272, Aug. 1983, pp. 35–39.

Emulsions: Theory and Practice, 2nd Ed., Becher, P. Ed., 1957, pp. 367–380. month not available.

Duval, J. et al., "High Content Bitumen Emulsions Emul. CR. 80," Revue Generale Des Routes et des Aerodnames, No. 669, Dec. 1989 pp. 79–82.

Holleran, G., "Use of Polymer Modification for Emulsion Chip Seals Under Inclement Conditions," *Proc. 5th Conf. on Asphalt Pavements for Southern Africa,* 5–9 Jun. 1989, VI, pp. 13–20.

Duval, J. et al., "High Content Bitumen Emulsions Etc.", No. 680, Dec. 90, pp. 85–86.

Gaestel, C. et al., "Use of Cationic Bitumen Emulsions in Skid–Resistant Surface Dressings on Main Roads and Motorways," pp. 201–217, *Proc. Symposium Theory and Practice of Emulsion Tech.,* 1974, Soc. of Chemical Industry, Brunel Univ., 11. month not available.

Baker, Ronald E., "The Technique of Polymer Modification in Bitumen Emulsions and Their Use in High Performance Road Surfacing Products," *Sixth Conf. Proc. Road Engineering Association of Asia and Australasia,* vol. 2, 4–10 Mar. 1990, Kuala Lumpur, pp. 1–18.

Agnusdei, J. O., et al., "Rheological Behavior of Asphalt Emulsions and asphalt Emulsion Residues," *Indian Highways,* Sep. 1990, pp. 31–39.

Porter, Ken, et al., "The Cold Overlay System, Innovative Pavement Surfacing Enhancing Management of Australian Road Pavements," *45th Municipal Engineers Conference,* 20–24 Feb. 1989, pp. 1–15.

Schilling, P. et al., "Improved Quick–Set Slurry Seal Emulsifiers with Tall Oil Derivatives," *Transportation Research Record,* Asphalt Materials and Mixtures, 1171, pp. 98–107. (1988) month not available.

Campbell, R., "The Development of Slurry Seal Surfacing," *Asphalt Technology,* No. 40, 1988, pp. 17–20. month not available.

Heslop, M. W., "Bitumen Emulsion Practice in the United Kingdom, With Special Reference to High Bitumen Content Emulsions and Polymer–modified Binders in Surface Dressing, (Spray Sealing)," Bitumen Emulsion Workshop, 1985, pp. 63–84. month not available.

Berkman, S. et al., "Emulsions and Foams," *Practical Knowledge of Emulsions,* 1941, pp. 285–287 and 404–421. month not available.

Shinoda, K. et al., "Factors Affecting the Phase Inversion Temperature (PIT) in an Emulsion," *Emulsions & Solubilization,* 1986, pp. 95–124. month not available.

Modern Road Emulsions, 3rd Ed., 1958, Manufacture of Bitumen Emulsions, p. 47. month not available.

"Theory and Practice of Emulsion Technology," Symposium on Theory and Practice of Emulsion Technology, Sep. 16–18, 1974, Smith, Ed., pp. 179–201. month not available.

Emulsion Technology, Theoretical and Applied, 2nd Ed., 1946, pp. 54–56. month not available.

Province, R. J., "Plant for Manufacturing Bitumen Emulsion," Bitumen Emulsion Workshop, pp. 157–168, 1985. month not available.

Dickinson, E. J., *Bituminous Roads in Australia,* p. 304, 1984. month not available.

Shinoda, K. et al., *Emulsions of Solubilization,* 1986, pp. 12–28 and pp. 129–135. month not available.

BITUMEN EMULSIONS

The present invention relates to a method for improving bitumen emulsions and to an improved bitumen emulsion. More particularly, this invention relates to improvements in respect to bitumen emulsions that may be used for sealing.

Bituminous emulsions were one of the earliest forms for sealing of roads and still remain as a common means for sealing roads. In more recent times, a change to hot spraying of bitumen came about due mainly to economic and also technical reasons. Technical problems associated with emulsions related to run-off, limits on bitumen level and to cure time. This particularly limited emulsion use for re-sealing of roads. The economic advantages of spraying bitumen were more evident. Despite the problems associated with emulsions referred to above there are other technical advantages that make them attractive despite these drawbacks.

One such development includes the EVERSEAL (TM) emulsions which were used where hot bitumen was not an alternative.

The initial trials in respect to use of this emulsion produced success which created impetus to continue with the trials. It was found however that when a 70% emulsion was sprayed in cold conditions with high wind chill, the emulsion was caused to flocculate into a cheesy state which will not wet the stone. These results were confirmed in further trials where in all cases the pavement temperature was below 9° C. and the wind chill was significant and was found that the emulsion did not wet either the pavement, stone or both.

These trials lead to an investigation on the basic mechanism of emulsion behaviour under cold conditions. It was thought the cutter content could stabilize emulsion against flocculation. However, the addition of higher levels of cutter presents a long term problem of binder softening and potential bleeding. Thus a number of new formulation tools were required. These included changes in manufacturing techniques and equipment in addition to the changes in respect to the chemical formulation. Applicational parameters were also modified to better suit the requirements of the emulsion.

This work led to an extension in the range of conditions which could be accomodated in the field. Trials were successfully carried out with pavement temperatures down to 6° C. It was felt that it was more due to wind chill factors, which could not be withstood that caused the cheesy effect reducing stone retention in the bitumen.

The problem was initially overcome by use of polymer modification. With such materials, pavement temperatures of as low as 4°–5° C. with wind chills of 5° C. have been accomodated. It was felt that one extremely important effect of the polymer modification is that rubber modified sealing can be done in cold conditions and the polymer provides green strength to decrease the tender or cure period.

Since the time that the Everseal Emulsion range was first developed it became evident that the curing time, particularly in poorer conditions needed to be faster.

The present invention attempts to overcome or at least alleviate one or more of the problems associated with these previous processes.

In particular, the present invention resides in a method of modifying bitumen emulsions wherein the method comprises the initiation of coalesence of the emulsion by either i) the addition of a specific chemical agent to the emulsion; or ii) physical reaction.

It is preferred that the initiation of coalesence is as a result of an increase in binder content for the emulsion.

It is particularly preferred that the bitumen emulsion is modified by the combination of a pre-emulsion solution of finer particle size distributions to replace part of the aqueous phase of a primary emulsion solution. This produces at least a bimodal particle distribution having improved packing and stability compared to a single distribution.

The invention further resides in an improved bitumen emulsion produced by the method as indicated above and to a bitumen emulsion having a binder content of at least 75% by weight of the binder.

HIGH BITUMEN CONTENT EMULSIONS

To break an emulsion requires coalescence of the bitumen, which can be initiated in a number of ways. An emulsion is a mixture of basically incompatible phases the discrete particles of the dispersed phase should be held apart. This can be done in a prophylactic manner by coating the particles and altering their surface chemistry or by creating a charged surface that actively repels a like charged surface.

Thus the interface between the discrete phase and the continuous phase is of some importance to the emulsion. The interface should not prevent coalesence entirely and so it should be capable of being broken down or overwhelmed. The interface should however, prevent coalesence for the storage period or type required.

Surface active agents can emulsify or stabilize or both, and therefore surfactant choice is of some importance.

MECHANISM OF COALESCENCE

The present invention is particularly applicable to bitumen emulsions wherein the interface may be broken down or overwhelmed. The coalescence of the bitumen particles is simply the merging of discrete particles into larger ones. According to the present invention this may be triggered by chemical reaction to overwhelm the interface or by pushing the particles so closely together that they invade each others double layer by force.

CHEMICAL REACTION

Cationic emulsions may have the surfactant system disrupted via reaction with, for example an aggregate or metal surface (in fact anything with a net negative charge). This is an exhaustive reaction and will only continue to occur while fresh surfaces are available for reaction, thus usually a thin film results and the rest of the emulsion, though destabilised by emulsifier lost, still breaks by evaporation induced coalescence.

Another technique is to add specific chemicals at the stage of application of the emulsion. The time for the destabilisation to occur should be longer than the reaction time with the aggregate or pavement under the conditions of application. That is, it reacts with stone then chemically breaks rather than waiting for evaporation. The emulsion breaker system thus further increases the rate of coalescence after the emulsion has reacted with the stone. These are applied in very small dosages (10–10,000 ppm) and sprayed through the emulsion as it is being sprayed or mixed in another way immediately before, during or after application of the emulsion or in manufacture.

Coalesence may be initiated by a number of classes of chemical additives having a predetermined effect upon the emulsion. For example, by use of short chain anionics, which may be dispersed in water in concentrations up to 10%, de-emulsification may occur.

The chemical type applied is required to change the HLB (Hydrophilic Lipophilic Balance at the interface of phases of the surfactant) significantly but in a controlled time. This will allow spreading of stone, coating and initial rolling embeddment. In this sense, the emulsion is sprayed onto the road with the additive sprayed on top or mixed with the emulsion immediately prior to spraying onto the surface.

Examples of suitable materials are ethylene glycol-monobutylether (phosphate), for example Teric 306 (TM), and calcium dodecylbenzene sulphonate, for example Alkynate CS (TM), which is a water dispersible anionic secondary emulsifier.

A further example is by use of Non Interactive Deemulsification. This is the use of a poor emulsifier that will displace the primary emulsifier from the bitumen, thereby destablising the emulsion.

Examples of such materials that may be used are the propylene oxide containing compound propylene glycol-ethoxylate (eg. PE-62(TM) and polyoxyalkylene glycol and glycol ethers (eg. Teric 407 (TM)).

A further example is hydrolysis. This method involves the use of a material that will chemically break down and form a species that will break the emulsion.

Materials that will hydrolyze will soak up the acid and increase pH. This will give a time dependence that will be long enough to allow adhesion but fast enough to improve cohesion.

A particular example is ethylene glycol di- acetate which will hydrolyze in either acid or base creating carboxylic acid groups. These are anionic.

Yet a further example is to raise the pH of the emulsion. A buffering type material such as triethanolamine, diethanolamine or monoethanolamine will raise pH slightly. This destabilises the emulsion but gives a dwell time.

Sodium silicate is a cheap weak base and as such is a suitable material to be used.

Yet a further example is to change the oil phase. A breaking agent, soluble in the oil phase is dissolved in the bitumen before emulsification. The break allows some oil into the water phase breaking the emulsion. Particular examples are oil soluble short chain aromatics or polar aromatics.

PHYSICAL REACTION

Coalescence may be achieved by physical reaction for example by shear or by simply depleting the continuous phase.

That is by reducing the water phase level in the formulation or by evaporation.

The promotion of a physical reaction depends on particles coming into close enough proximity so as to overwhelm the surfactant system. This can be done by force drying, shearing, cooling or by reducing the effective volume of aqueous phase between particles. In such an instance it is preferable to ensure sufficient stability of the emulsion so that coalescence does not occur in storage. This can be done by storage at elevated temperatures and or, surfactant engineering.

To reduce the aqueous phase level implies a great increase in the efficiency of the emulsifier system, an improvement in particle packing, or both.

Improvements in packing systems are difficult as the particle size distribution sets packing and this is fairly much fixed for a given system. The colloid mill will determine initial particle size distribution and the surfactant system will determine the steady state distribution.

If, however two particle size distributions are superimposed and the ratio between the mean size is suitable (0.1–0.5, with similar spreads as would be characteristic of a single mill type), then the packing is improved. That is a coarse but tight distribution packs in a fine and tight distribution within itself. Three or more distributions may also be used.

The binder should also be dense enough to allow a sufficient weight percentage increase as well as volume percent. Any emulsifiable bitumen is acceptable. Cutter levels of 0–8% are most preferred.

Emulsifier contents of the order of 0.3–8% are also preferred.

MANUFACTURING METHODS

Bitumen emulsification effectively makes fine particles of a given particle size distribution. Two emulsions added together could give a total emulsion with better packing if there were some way to reduce the aqueous phase level. This could be done by evaporation of the finished emulsion but control would be difficult.

VIA AQUEOUS PHASE

If the aqueous phase is to be reduced but a bimodal distribution is required it is not possible to simply reduce the aqueous phase. However, if the part of the water is replaced by an emulsion of a finer distribution and this is processed with fresh bitumen then the total binder is increased with improved packing and thus improved stability compared to a single size distribution.

The present invention further resides in a method of modifying a bitumen emulsion characterised in that at least a second emulsion is combined with a primary emulsion to create at least a bimodal distribution having improved packing.

A percentage of bitumen emulsion is added to the soap solution replacing a part of the water to give the required result. The emulsion would be made as stable as possible so that it remains as fine as possible. Thus the surfactant system may be of the low zeta potential type or increased over Everseal standard levels of 0.1–0.29% (based on emulsion weight) to up to 8%.

VIA RECYCLE

The system may be automated by the introduction of a recycle loop in a colloid mill. The start is up for 60–70% emulsion with appropriate water phase level. A part of the outflow is proportioned back into the mill, either separately or as part of the aqueous stream. The flows are then adjusted to the required steady state levels for at least a 75% binder.

The double pass of the part of the emulsion gives the required bimodal distribution.

In all cases a time period between spraying and coalescene is programmed to allow for wetting of pavement by the stone.

The following examples are intended to be illustrative of the present invention. They are not intended and it will be appreciated that the scope of the invention is not limited thereto.

EXAMPLE 1

The Use of Breakers

Base Emulsion. Everseal 70. (TM)

The breaker was selected from the following:

Water dispersed sodium silicate;

Triethanolamine (TEA);

Teric 306 dispersed in Pegasol 3445;

Teric PE62;

Teric 407;

Alkynate CS.

The following were conducted to standard break/cure time tests.

A dosage to halve the time for initial cure compared to the base emulsion is illustrated in Table 1. The breaker is premixed by spraying into the stream of the emulsion, or premixed with the emulsion, (Method I); or sprayed onto the emulsion after spraying by a mist spray from emulsion sprayer, spreader or from the water system of a roller. (Method II).

TABLE I

| Breaker | Dosage ppm | Application Method |
|---|---|---|
| Sodium Silicate | 25 | I |
| Sodium Silicate | 40–80 | II |
| TEA | 25 | I |
| TEA | 40–80 | II |
| Teric 306 | 70–100 | I |
| Teric 306 | 125–180 | II |
| Teric PE 62 | 250–500 | I |
| Teric 407 | 1000–5000 | I |
| Alkynate CS | 700–1000 | I |

EXAMPLE 2

Effect of Emulsifier Change.

Emulsifier types used:

A) Mixed fatty diamine chlorine salt.

B) Fatty Diamine chloride

C) N propylene alkyl diamine ethoxylated and non ethoxylated (chloride)

D) Quaternery ammonium compounds (Pentamethyl diammonium chloride)

E) Tallow diamine (chloride)

(ALTERNATIVE ACIDS: to neutralize the above are pellagonic, acetic, nitric, sulphuric or phosphoric in any form).

The breaker was selected from the following:

Sodium Silicate dispersed in water;

Triethanolamine;

Teric 306 dispersed in Pegasol 3445.

Teric PE62;

Teric 407;

Alkynate CS;

The following were conducted to standard break/cure time tests.

The dosage to halve the time of initial cure compared to base emulsion is illustrated in Table II. The breaker was premixed by spraying into stream of emulsion, or premixed with emulsion.

| | Selected Results | |
|---|---|---|
| Breaker | Dosage ppm | Emulsifier (conc on emulsion) |
| Sodium Silicate | 25 | A (0.3%) |
| Sodium Silicate | 50 | A (1.0%) |
| Sodium Silicate | 600 | B (1.0%) |
| TEA | 25 | A (0.3%) |
| TEA | 100 | A (1.0%) |
| TEA | 1000 | B (1.0%) |
| Teric 306 | 70–100 | A (0.3%) |
| Teric 306 | 150 | A (1.0%) |
| Teric 306 | 5000–10,000 | B (1.0%) |
| Teric PE62 | 250 | A (0.3%) |
| Teric PE62 | 500–1000 | A (1.0%) |
| Teric PE62 | 700–1500 | D (1.0%) |
| Alkynate CS | 500–1000 | A (0.3%) |
| Alkynate CS | 500–1000 | C (0.3%) |
| Alkynate CS | >10000 | B (1.0%) |
| Sodium Silicate | 25–50 | D (0.5%) |
| TEA | 100 | E (1.0%) |
| Teric 306 | 150 | C (0.6%) |

The temperatures for the following examples during the illustrated process are as follows:

aqueous phase: 25° to 32° C.

binder phase: 135° to 140° C.

exit temperature: approximately 86° C.

EXAMPLE 3

A pre emulsion was made as follows:

65% by weight bitumen;

35% by weight surfactant solution.

The surfactant solution was made up of:

Fatty Diamine/Monoamine Proprietary emulsifier: 0.35% (based on total emulsion)

Hydrochloric Acid: to pH 1.8–2.3.

This emulsion was then combined in an aqueous solution at the following proportions.

65% pre emulsion

35% surfactant solution.

The surfactant solution contains.

0.1% Fatty Diamine mix as above, (based on total final emulsion) Hydrochloric acid to pH 1.8–2.3.

The final emulsion is made with 65% bitumen 35% aqueous solution.

In all steps a colloid mill is used, (high shear suitable for manufacturing very fine bitumen emulsions). A particular illustration of this is illustrated in Figure I.

FIG. 1 illustrates under flow diagram (a) existing techniques where a soap solution, consisting of a surfactant solution is combined with a bitumen in a colloid mill to produce an emulsion having a 70% binder level.

Flow diagram (b) illustrates the introduction of a recycle step where a pre-emulsion solution is added back to the soap solution to achieve an emulsion with 80% binder content. By continuous recycle of a pre-emulsion solution, the flow rate of the emulsion may be improved as illustrated under flow diagram (c).

During the process, the materials are stored at temperatures in excess of 50° C. The properties according to Australian standards 1160(1989) are as follows:

The final emulsion is smooth and even, and is stable at elevated temperatures.

Viscosity can vary depending on base bitumen but is pourable at ambient.

Viscosity is over 1000 cp at ambient.

Binder Content is 78% minimum. The binder material maybe Evabond™ or rubber latex may be post added.

pH is <3.0.

Break time is <3 minutes

Spray temperature is 85°–89° C.

If the binder level is reduced by the same technique the viscosity falls.

EXAMPLE 4

This example demonstrates the use of C320 bitumen for 80% emulsion.

The following were used:

Primary Emulsifier: N alkyl Propylene diamine ethoxylated Type (Dinoram SL)

Cutter Level (Mineral Turpentine): 2%

Binder Level: 80%.

A pre-emulsion was made as follows:

65% by weight bitumen

35% by weight surfactant solution

Surfactant solution: 0.5% emulsifier (based on total emulsion)

hydrochloric acid to a pH of 1.8–2.5

The total emulsion included:

Aqueous phase: 65% pre-emulsion 35% surfactant solution

Bitumen Phase: 98% C320 2% Mineral Turpentine

The properties for the resultant emulsion, with tests according to Australian standards AS1160(1989) were as follows:

Setting Time: 1–2 minutes

Binder Content: 79% pH: <3.0

Viscosity (Brookfield): 2650 cp (70° C.)

Cure Time: <60 minutes

EXAMPLE 5

This example demonstrates the use of C80 bitumen with the following being used:

Primary Emulsifier: N alkyl Propylene diamine ethoxylated Type (Dinoram SL)

Cutter Level (Mineral Turpentine): 0%

Binder Level: 80%

A pre-emulsion was made up as follows:

65% by weight bitumen

35% by weight surfactant solution

Surfactant solution: 0.5% emulsifier (based on total emulsion)

hydrochloric acid to a pH of 1.8–2.5

The total Emulsion included:

Aqueous phase: 65% pre-emulsion 35% surfactant solution

Bitumen phase: C80

The properties for the resultant emulsion with tests according to Australian standard AS1160(1989) were as follows:

Setting Time: <3 minutes

Binder Content: 80% pH: <3.0

Viscosity (Brookfield): 5200 cp at 70° C.

Cure Time: <60 minutes.

EXAMPLE 6

This example demonstrates the use of Evabond S5 (TM) with the following being used.

Primary Emulsifier: N alkyl Propylene diamine ethoxylated Type (Dinoram SL)

Cutter Level (Mineral Turpentine): 2%

Binder Level: 80%

A pre-emulsion was made as follows:

65% by weight bitumen

35% by weight surfactant solution

Surfactant solution: 0.5% emulsifier (based on total emulsion) hydrochloric acid to a pH of 1.8–2.5

The total emulsion included:

Aqueous phase: 65% pre-emulsion 35% surfactant solution

Bitumen Phase: 98% Evabond S5 2% Mineral Turpentine

The properties for the resultant emulsion, with tests according to Australian standards AS1160(1989) were as follows:

Setting Time: <3 minutes

Binder Content: 79% pH: <3.0

Viscosity: 3500 cp at 70° C.

Cure Time: <60 minutes

EXAMPLE 7

This example demonstrates the use of latex modified C170 base with the following being used.

Primary Emulsifier: N alkyl Propylene diamine ethoxylated Type (Dinoram SL)

Cutter Level (Mineral Turpentine): 2%

Binder Level: 80%

A Pre-emulsion was made as follows:

65% by weight bitumen

35% by weight surfactant solution

Surfactant solution: 0.5% emulsifier (based on total emulsion)

The total emulsion included:

Aqueous phase: 65% pre-emulsion 35% surfactant solution

Bitumen Phase: 98% C170 2% Mineral Turpentine

The exit temperature for the emulsion was 86° C. The latex was added at emulsion temperature of 70° C. at 5% high solid latex.

The properties for the resultant emulsion with tests according to Australian standards AS1160(1989) were as follows:

Setting Time: <2 minutes

Binder Content: 80% pH: <3.0

Viscosity (Brookfield): 2600 cp at 70° C.

Cure Time: <60 minutes

EXAMPLE 8

This example demonstrates the use of a recycle step and the following were used.

Primary Emulsifier: N alkyl Propylene diamine ethoxylated Type (Dinoram SL)

Cutter Level (Mineral Turpentine): 2%

Binder Level: 80%

A surfactant solution was made up as follows:

0.6% emulsifier (based on total emulsion) hydrochloric acid to a pH of 1.8–2.5

During the process the following flow rates were used however any combination of flow rates may be used as long as total binder contents in any output or recycle stream remains the same. The exit temperature is approximately 86° C.

Starting Up: Soap solution: Flow 72 lt/min Bitumen Flow: 168 lt/min

Start Recycle: Reduce Soap to 42 lt/min Recycle cooled emulsion at 30 lt/min Binder stable.

Steady State: Adjust Soap to 48 lt/min Adjust Bitumen to 192 lt/min

The properties of the resultant emulsion, with tests according to Australian standard AS1160(1989) were as follows:

Setting Time: <2 minutes

Binder Content: 78% pH: <3.0

Viscosity (Brookfield):3000 cp at 70° C.

Cure Time: <60 minutes.

It should be understood that the embodiments described herein are merely preferable and that alterations and amendments that do not depart from the spirit of the invention are also included within its scope.

I claim:

1. A method of initiating and accelerating coalescence in a cationic bitumen emulsion, comprising the steps of:

providing a primary emulsifier system of a cationic bitumen emulsion that has been emulsified by a primary emulsifier; and adding to the emulsion a chemical agent selected from the group consisting of sodium or calcium silicic acid in salt form or ethylene glycol diacetate in a sufficient quantity to raise the pH of the emulsion to initiate and accelerate coalescence by destabilizing the primary emulsifier system.

2. A method according to claim 1, wherein the emulsion is raised from an initial pH of 1.8 to 3.5 to a final pH of from 3.0 to 12.0.

3. A method according to claim 1, wherein the emulsion is suitable for sealing a bitumen surface by being sprayed onto that surface, wherein 10–10,000 ppm of the chemical agent is added to the emulsion by either:

i) adding directly to the emulsion prior to spraying, ii) spraying onto the surface before spraying the emulsion; and iii) spraying onto the sprayed emulsion.

4. A method according to claim 1, wherein the emulsion includes cutter levels of from 0 to 8% by weight.

5. A method according to claim 1, wherein 0.3 to 8% by weight of an emulsifier is added to the emulsion.

6. A method according to claim 1, wherein said chemical agent is distinct from said primary emulsifier system.

7. A method of initiating and accelerating coalescence in a cationic bitumen emulsion, comprising the steps of:

providing a primary emulsifier system of a cationic bitumen emulsion that has been emulsified by a primary emulsifier; and adding to the emulsion a chemical agent capable of initiating and accelerating coalescence of the emulsion in a sufficient quantity to initiate and accelerate coalescence by destabilizing the primary emulsifier system, wherein the chemical agent is an oil soluble short chain aromatic or polar aromatic breaker agent, and is added prior to emulsification of the bitumen.

8. A method of initiating and accelerating coalescence in a cationic bitumen emulsion, comprising the steps of:

providing a primary emulsifier system of a cationic bitumen emulsion that has been emulsified by a primary emulsifier; and adding to the emulsion, in a sufficient quantity to initiate and accelerate coalescence by destabilizing the primary emulsifier system, a chemical agent selected from propylene oxide containing compounds, ethylene glycol monobutyl ether phosphate, calcium dodecylbenzene sulphate, or a chemical agent able to modify a hydrophobic lipophilic balance at an interface of phases of the emulsion.

9. A method according to claim 8, wherein the propylene oxide containing compound is selected from the group consisting of a propylene glycol ethoxylate, polyoxyalkylene glycols and a glycol ether.

* * * * *